US012775844B2

(12) United States Patent
Csurka Khedari et al.

(10) Patent No.: US 12,775,844 B2
(45) Date of Patent: Oct. 27, 2026

(54) LANGUAGE-BASED EXPLAINABILITY OF ERRORS MADE BY COMPUTER VISION MODELS

(71) Applicant: NAVER CORPORATION, Gyeonggi-do (KR)

(72) Inventors: Gabriela Csurka Khedari, Meylan (FR); Tyler Hayes, Grenoble (FR); Diane Larlus, La Tronche (FR); Riccardo Volpi, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 488 days.

(21) Appl. No.: 18/531,247

(22) Filed: Dec. 6, 2023

(65) Prior Publication Data

US 2025/0190777 A1 Jun. 12, 2025

(51) Int. Cl.
*G06N 3/08* (2023.01)
*G06F 16/55* (2019.01)
*G06F 18/23213* (2023.01)

(52) U.S. Cl.
CPC ............... *G06N 3/08* (2013.01); *G06F 16/55* (2019.01); *G06F 18/23213* (2023.01)

(58) Field of Classification Search
CPC ........................................................ G06N 3/08
See application file for complete search history.

(56) References Cited

U.S. PATENT DOCUMENTS

2026/0141239 A1* 5/2026 Ma .......................... G06N 3/08

OTHER PUBLICATIONS

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In ICML, 2021.

An Yan, Xin Wang, Tsu-Jui Fu, and William Yang Wang. L2C: Describing visual differences needs semantic understanding of individuals. In ACL, 2021.

Badr Youbi Idrissi, Diane Bouchacourt, Randall Balestriero, Ivan Evtimov, Caner Hazirbas, Nicolas Ballas, Pascal Vincent, Michal Drozdzal, David Lopez-Paz, and Mark Ibrahim. Imagenet-x: Understanding model mistakes with factor of variation annotations. arXiv:2211.01866, 2022.

(Continued)

*Primary Examiner* — Y Lee

(57) ABSTRACT

A system includes: a model configured to determine uncertainties of results of a task based on images, respectively; a classification module configured to selectively classify the images into a first category or a second category based on the uncertainties, respectively; an embedding module configured to: determine first embeddings based on the images using an embedding function; determine second embeddings for textual explanations of errors, respectively, using the embedding function; a clustering module configured to: cluster first ones of the first embeddings for images classified in the first category into first clusters; cluster second ones of the first embeddings for images classified in the second category into second clusters; and an explanation module configured to: determine similarities between each of the first and second clusters and each of the textual explanations; and determine k of the textual explanations for one of the second clusters based on the similarities.

22 Claims, 6 Drawing Sheets

(56) References Cited

OTHER PUBLICATIONS

Bolei Zhou, Aditya Khosla, Agata Lapedriza, Aude Oliva, and Antonio Torralba. Learning deep features for discriminative localization. In CVPR, 2015.
Christos Sakaridis, Dengxin Dai, and Luc Van Gool. ACDC: The Adverse Conditions Dataset with Correspondences for Semantic Driving Scene Understanding. In ICCV, 2021.
Christos Sakaridis, Dengxin Dai, Simon Hecker, and Luc Van Gool. Model adaptation with synthetic and real data for semantic dense foggy scene understanding. In ECCV, 2018.
Dan Hendrycks and Thomas Dietterich. Benchmarking Neural Network Robustness to Common Corruptions and Perturbations. In ICLR, 2019.
Dong Huk Park, Trevor Darrell, and Anna Rohrbach. Robust change captioning. In ICCV, 2019.
Enze Xie, WenhaiWang, Zhiding Yu, Anima Anandkumar, Jose M. Alvarez, and Ping Luo. SegFormer: Simple and Efficient Design for Semantic Segmentation with Transformers. In NeurIPS, 2021.
Fawaz Sammani, Tanmoy Mukherjee, and Nikos Deligiannis. Nlx-gpt: A model for natural language explanations in vision and vision-language tasks. In CVPR, pp. 8322-8332, 2022.
Girish Varma, Anbumani Subramanian, Anoop Namboodiri, Manmohan Chandraker, and C.V. Jawahar. IDD: A Dataset for Exploring Problems of Autonomous Navigation in Unconstrained Environments. In WACV, 2019.
Greg d'Eon, Jason d'Eon, James R Wright, and Kevin Leyton-Brown. The spotlight: A general method for discovering systematic errors in deep learning models. In 2022 ACM Conference on Fairness, Accountability, and Transparency, pp. 1962-1981, 2021.
Harsh Jhamtani and Taylor Berg-Kirkpatrick. Learning to describe differences between pairs of similar images. In ACL, 2018.
Irena Gao, Gabriel Ilharco, Scott Lundberg, and Marco Tulio Ribeiro. Adaptive testing of computer vision models. arXiv:2212.02774, 2022.
Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. IEEE, 2009.
Jianming Zhang, Sarah Adel Bargal, Zhe Lin, Jonathan Brandt, Xiaohui Shen, and Stan Sclaroff. Top-down neural attention by excitation backprop. In ECCV, 2016.
Jinkyu Kim, Anna Rohrbach, Trevor Darrell, John Canny, and Zeynep Akata. Textual explanations for self-driving vehicles. In ECCV, 2018.
Joe H. Ward. Hierarchical Grouping to Optimize an Objective Function. Journal of the American Statistical Association, 58(301):236-244, 1963.
Joshua Vendrow, Saachi Jain, Logan Engstrom, and Aleksander Madry. Dataset interfaces: Diagnosing model failures using controllable counterfactual generation, 2023.
Kento, Doi, Ryuhei Hamaguchi, Shun Iwase, Rio Yokota, Yutaka Matsuo, Ken Sakurada, et al. Epipolar-guided deep object matching for scene change detection. arXiv:2007.15540, 2020.
Laurens Van der Maaten and Geoffrey Hinton. Visualizing data using t-sne. Journal of Machine Learning Research, 9(11), 2008.
Lisa Anne Hendricks, Ronghang Hu, Trevor Darrell, and Zeynep Akata. Generating counterfactual explanations with natural language. In ICML Workshops, 2018.
Lisa Anne Hendricks, Ronghang Hu, Trevor Darrell, and Zeynep Akata. Grounding visual explanations. In ECCV, 2018.
Lisa Anne Hendricks, Zeynep Akata, Marcus Rohrbach, Jeff Donahue, Bernt Schiele, and Trevor Darrell. Generating visual explanations. In ECCV, 2016.
Marco Tulio Ribeiro, Sameer Singh, and Carlos Guestrin. "why should i trust you?" explaining the predictions of any classifier. In sigkdd, 2016.
Marius Cordts, Mohamed Omran, Sebastian Ramos, Timo Rehfeld, Markus Enzweiler, Rodrigo Benenson, Uwe Franke, Stefan Roth, and Bernt Schiele. The Cityscapes Dataset for Semantic Urban Scene Understanding. In CVPR, 2016.
Mehrdad Hosseinzadeh and Yang Wang. Image change captioning by learning from an auxiliary task. In CVPR, 2021.
Olivia Wiles, Isabela Albuquerque, and Sven Gowal. Discovering bugs in vision models using off-the-shelf image generation and captioning. In NeurIPS Workshops, 2022.
Paul Jacob, Eloi Zablocki, Hedi Ben-Younes, Mickael Chen, Patrick Perez, and Matthieu Cord. Steex: steering counterfactual explanations with semantics. In ECCV, pp. 387-403, 2022.
Peng Wang, An Yang, Rui Men, Junyang Lin, Shuai Bai, Zhikang Li, Jianxin Ma, Chang Zhou, Jingren Zhou, and Hongxia Yang. OFA: Unifying Architectures, Tasks, and Modalities Through a Simple Sequence-to-Sequence Learning Framework. arXiv:2202.03052, 2022.
Ragav Sachdeva and Andrew Zisserman. The change you want to see. In WACV, 2022.
Ramprasaath R Selvaraju, Michael Cogswell, Abhishek Das, Ramakrishna Vedantam, Devi Parikh, and Dhruv Batra. Grad-CAM: Visual explanations from deep networks via gradient-based localization. In ICCV, 2019.
Robin Rombach, Andreas Blattmann, Dominik Lorenz, Patrick Esser, and Bjorn Ommer. High-resolution image synthesis with latent diffusion models. In CVPR, 2022.
Rui Huang, Ruofei Wang, Qing Guo, Jieda Wei, Yuxiang Zhang, Wei Fan, and Yang Liu. Background-mixed augmentation for weakly supervised change detection. arXiv:2211.11478, 2023.
Saachi Jain, Hannah Lawrence, Ankur Moitra, and Aleksander Madry. Distilling model failures as directions in latent space. arXiv:2206.14754, 2022.
Sabri Eyuboglu, Maya Varma, Khaled Saab, Jean-Benoit Delbrouck, Christopher Lee-Messer, Jared Dunnmon, James Zou, and Christopher R'e. Domino: Discovering systematic errors with cross-modal embeddings. In ICLR, 2022.
Tiffany (Tianhui) Cai, Hongseok Namkoong, and Steve Yadlowsky. Diagnosing model performance under distribution shift. arXiv:2303.02011, 2023.
Xiaowei Hu, Chi-Wing Fu, Lei Zhu, and Pheng-Ann Heng. Depth-attentional features for single-image rain removal. In CVPR, 2019.
Yash Goyal, Ziyan Wu, Jan Ernst, Dhruv Batra, Devi Parikh, and Stefan Lee. Counterfactual visual explanations. In ICML, 2019.
Yunbin Tu, Liang Li, Li Su, Ke Lu, and Qingming Huang. Neighborhood contrastive transformer for change captioning. IEEE Transactions on Multimedia, 2023.
Yunbin Tu, Tingting Yao, Liang Li, Jiedong Lou, Shengxiang Gao, Zhengtao Yu, and Chenggang Yan. Semantic relation-aware difference representation learning for change captioning. In Findings of the Association for Computational Linguistics: ACL-IJCNLP 2021.
Zhuang Liu, Hanzi Mao, Chao-Yuan Wu, Christoph Feichtenhofer, Trevor Darrell, and Saining Xie. A ConvNet for the 2020s. In CVPR, 2022.

* cited by examiner

LANGUAGE-BASED EXPLAINABILITY OF ERRORS MADE BY COMPUTER VISION MODELS

FIELD

The present disclosure relates to models configured to perform tasks on input images and more particularly to systems and methods for determining explanations of errors made by such models.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are one type of robot and are an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, an error explanation system includes: a model configured to perform a task on images of an image dataset and to determine uncertainties of results of the task based on the images, respectively; a classification module configured to selectively classify the images into a first category or a second category based on the uncertainties, respectively; an embedding module configured to: determine first embeddings based on the images using an embedding function; determine second embeddings for textual explanations of errors of the model based on the textual explanations, respectively, using the embedding function; a clustering module configured to: cluster first ones of the first embeddings for images classified in the first category into first clusters; cluster second ones of the first embeddings for images classified in the second category into second clusters; and an explanation module configured to: determine similarity between each centroid of each of the first and second clusters and each of the textual explanations; and determine k of the textual explanations for one of the second clusters based on the similarities, where k is an integer greater than or equal to one.

In further features, the embedding function is the CLIP embedding function.

In further features, the classification module is configured to: classify first ones of the images into the first category based on the first ones of the uncertainties of the first ones of the images being less than a first predetermined value; and classify second ones of the images into the second category based on the second ones of the uncertainties of the second ones of the images being greater than a second predetermined value.

In further features, the first predetermined value is equal to the second predetermined value.

In further features, the first predetermined value is less than the second predetermined value.

In further features, the explanation module is configured to discard third ones of the images based on third ones of the uncertainties of the third ones of the images being between the first predetermined value and the second predetermined value.

In further features, the clustering module is configured to cluster first ones of the first embeddings into the first clusters using a clustering algorithm.

In further features, the clustering algorithm includes k means clustering.

In further features, the clustering algorithm includes one of agglomerative clustering and spectral clustering.

In further features, the images of the image dataset do not include labels indicative of attributes of the images, respectively.

In further features, the textual explanations are sentences of text.

In further features, the explanation module is configured to, based on differences between similarities corresponding to the same sentences and normalization, determine the k of the textual explanations for the one of the second clusters.

In further features, the k of the textual explanations describe how the one of the second clusters differs from one of the first clusters.

In a feature, a robot includes: the error explanation system; a camera; and a control module configured to take a remedial action based on an image from the camera being associated with the k of the textual explanations.

In further features, the remedial action includes turning on a light of the robot.

In further features, the explanation module is configured to determine the similarities using cosine similarities.

In a feature, a system includes: a camera; and the error explanation system.

In a feature, a system for determining explanations for uncertain results includes: a neural network model configured to perform a task on input data of an input dataset and to determine uncertainties of results of the task based on the input data, respectively, where input data of the input dataset do not include labels indicative of attributes of the input data, respectively; a classification module configured to selectively classify the input data into a first category or a second category based on their uncertainties of results of the task determined by the neural network model, respectively; an embedding module configured to, using an embedding function, determine first embeddings based on the input data of the dataset and second embeddings based on textual explanations of uncertainties of results of an explanation dataset, where the textual explanation of uncertainties of results in the explanation dataset identify characteristics of the input data that may result in uncertainty of results when the neural network model performs the task on the input data, respectively; a clustering module configured to cluster the first embeddings for input data into a first cluster and a second cluster, corresponding to a first category and a second category, respectively; and an explanation module configured to determine k of the textual explanations for one of first and the second clusters having highest degree of similarity with the textual explanations of uncertainties of results of the explanation dataset, where k is an integer greater than or equal to one.

In further features, the input data is image data and the input dataset is an image dataset.

In further features, the textual explanations explain a possible source of error associated with the task performed on the image using the neural network model.

In a feature, a system for determining explanations for uncertain results, includes: a neural network model configured to perform a task on image data of an image dataset and to determine uncertainties of results of the task based on the image data, respectively, where image data of the image dataset do not include labels indicative of attributes of the image data, respectively; a classification module configured to selectively classify the image data into a first category or a second category based on their uncertainties of results of the task determined by the neural network model, respectively; an embedding module configured to use an embedding function to determine first embeddings based on the image data of the dataset and second embeddings based on textual explanations of uncertainties of results of an explanation dataset, where the textual explanation of uncertainties of results in the explanation dataset identify characteristics of the image data that may result in uncertainty of results when the neural network model performs the task on the image data, respectively; a clustering module configured to cluster the first embeddings for image data into a first cluster and a second cluster, corresponding to a first category and a second category, respectively; and an explanation module configured to determine k of the textual explanations for one of first and the second clusters having highest degree of similarity with the textual explanations of uncertainties of results of the explanation dataset, where k is an integer greater than or equal to one.

In a feature, an error explanation method includes: by a model configured to perform a task on images of an image dataset, determining uncertainties of results of the task based on the images, respectively; selectively classifying the images into a first category or a second category based on the uncertainties, respectively; determining first embeddings based on the images using an embedding function; determining second embeddings for textual explanations of errors of the model based on the textual explanations, respectively, using the embedding function; clustering first ones of the first embeddings for images classified in the first category into first clusters; clustering second ones of the first embeddings for images classified in the second category into second clusters; determining similarity between each centroid of each of the first and second clusters and each of the textual explanations; and determining k of the textual explanations for one of the second clusters based on the similarities, where k is an integer greater than or equal to one.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
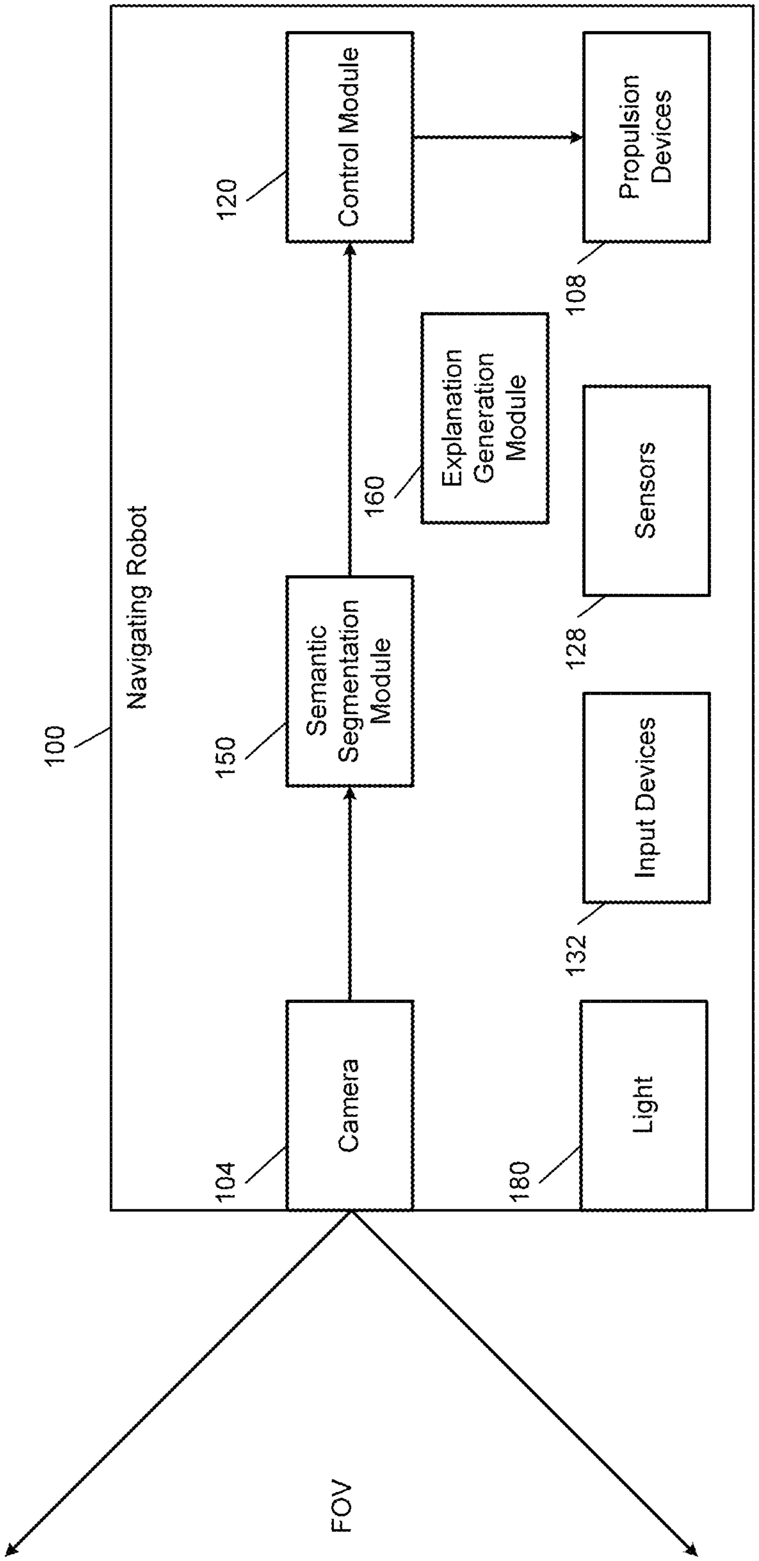
FIGS. 1 and 2 are functional block diagrams of example robots.

A robot may include a camera. Images from the camera and measurements from other sensors of the robot can be used to control actuation of the robot, such as propulsion, actuation of one or more arms, and/or actuation of a gripper.

Some types of robots may determine a segmentation mask of an object in an image and its class (name) using a vision model, such as a semantic image segmentation (SIS) model. When deploying machine learning systems in the real world, being able to understand their behaviors is important. A standard example is safety-critical applications, such as self-driving vehicles. Yet, this is not an easy task in the context of modern, deep learning-based models. While such models may excel in a broad variety of tasks, they lack interpretability, operating mostly as black boxes. Among many factors, this black box nature increases a difficulty of deployment. Understanding possible reasons for error in answers of such models is helpful.

The present application involves determining explanations (e.g., textual descriptions) for possible error (or uncertanties/error source) in answers/results of a model. The explanations may improve training of the model, therefore increasing model performance when deployed.

Given a model and a pool of (e.g., unlabeled) samples, the present application involves a set of short text descriptions that explain the model output errors (or uncertanties/error source) and the reasons of failure throughout the provided set. The present application generates short text descriptions of the model's failure cases for arbitrary computer vision tasks, such as semantic image segmentation and other tasks. The present application involves an image dataset assess the model on, a set of sentences describing potential generic aspects of the dataset (e.g., related to the light or the weather in outdoor scenes), and a cross-modal embedding space in which both the images and the text can be represented. First, an explanation generation module receives some "easy" samples for which the model prediction is likely to be correct and some "hard" samples where the model is likely to fail. If the ground-truth is available, it can be used to label samples as "easy" or "hard", depending on whether the model makes the right prediction or not. Second, the explanation generation module embeds the easy and hard samples in the cross-modal space and clusters those embedding vectors to obtain a number of "easy" and "hard" clusters—e.g., each represented by a prototype (centroid). Next, the explanation generation module determines the semantic similarity between each "easy" and "hard" prototype and each element of the set of sentences. To characterize a "hard" cluster, the explanation generation module considers all of the similarities between its prototype and the sentences, as well as the same similarities for the closest "easy" cluster. Using the differences between similarities corresponding to the same sentences and an appropriate normalization strategy, each "hard" cluster is associated with a set of (e.g., the top-k) sentences that describes how it differs from the closest "easy" cluster. The selected sentences provide reasonably accurate explanations of the failures or challenges of the model associated with that hard cluster.

The systems and methods described herein can help detect domains where the model performs sub-optimally, such as to guide the collection of additional samples for a retraining phase of the model, or it can be used in a fully integrated pipeline in combination with an active learning loop. The systems and methods described herein can also guide the generation of specific data augmentation rules that address the mistakes made by the model. Combined with a decision making process such as in robotics, the systems and methods described herein can be used to predict that a new sample will be hard to process and, hence, to endow the robot with the possibility to act accordingly, such as if low lighting conditions were detected the robot could possibly light up the environment or ask for help.

The present application involves the problem of language-based explainability of machine learning models, such as associating a natural language explanation with the errors made by a given model. The model may be a computer vision model and applications may involve tasks such as, but not limited to, image classification and semantic image segmentation.

FIG. 1 is a functional block diagram of an example implementation of a navigating robot 100. The navigating robot 100 is a vehicle and is mobile. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces. In various implementations, the camera 104 may be a binocular camera, or two or more cameras may be included in the navigating robot 100.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

A semantic segmentation module 150 segments objects in the images in the camera. Segmenting objects is different than object detection in that object detection involves identifying boundary boxes around the objects in images. Segmentation involves identifying the pixels that bound an object within an image.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The robot 100 is powered, such as via an internal battery and/or via an external power source, such as wirelessly (e.g., inductively).

While the example of a navigating robot is provided, the present application is also applicable to other types of robots with a camera.

Figure 2:
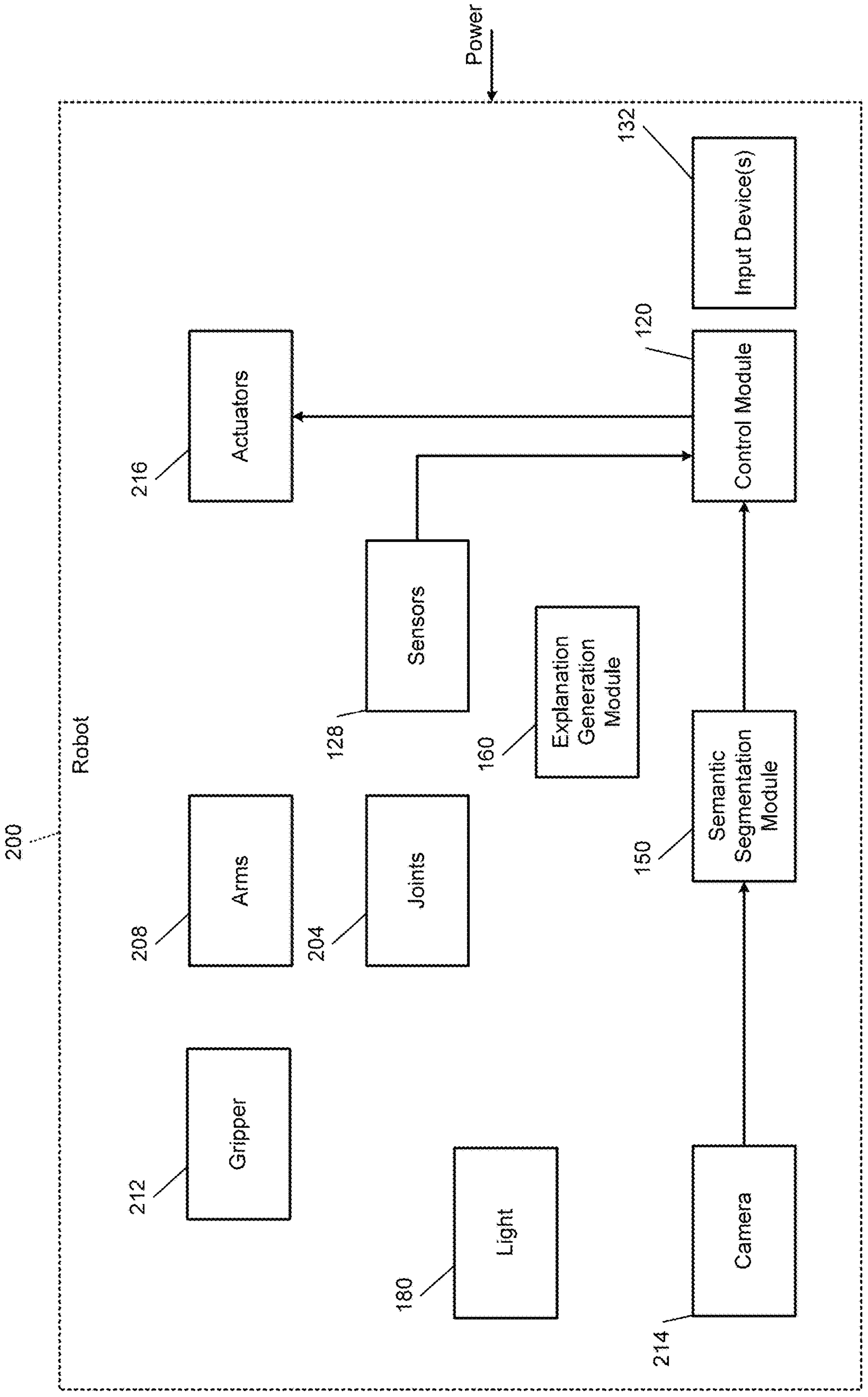

For example, FIG. 2 includes a functional block diagram of an example robot 200. The robot 200 may be stationary or mobile. The robot 200 may be, for example, a 5 degree of freedom (DoF) robot, a 6 DoF robot, a 7 DoF robot, an 8 DoF robot, or have another number of degrees of freedom. In various implementations, the robot 200 may include the Panda Robotic Arm by Franka Emika, the mini Cheetah robot, or another suitable type of robot.

The robot 200 is powered, such as via an internal battery and/or via an external power source, such as alternating current (AC) power. AC power may be received via an outlet, a direct connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of a (multi fingered) gripper 212 of the robot 200. The robot 200 includes actuators 216 that actuate the arms 208 and the gripper 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the gripper 212, etc.) of the robot 200.

The control module 120 may include a planner module configured to plan movement of the robot 200 to perform one or more different tasks. An example of a task includes moving to and grasping and moving an object. The present application, however, is also applicable to other tasks, such as navigating from a first location to a second location while avoiding objects and other tasks. The control module 120 may, for example, control the application of power to the actuators 216 to control actuation and movement. Actuation of the actuators 216, actuation of the gripper 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 hertz (Hz), 120 Hz, or another suitable frequency. In various implementations, the camera 214 may be a binocular camera, or two or more cameras may be included in the robot 200.

The control module 120 controls actuation of the robot based on one or more images from the camera, such as the objects segmented in the images. The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, and/or one or more other suitable types of input devices.

An explanation generation module 160 generates textual explanations of possible sources of error in images, respectively. Examples of explanations include but are not limited to image taken at night, image includes snow, image includes one or more pedestrians, object is blocked, image taken at an intersection, image includes one or more small objects, etc. An explanation for an image includes text describing a possible source of error associated with a task performed on the image, such as semantic image segmentation.

While the example of semantic image segmentation is provided, the present application is also applicable to other tasks performed on images, such as classification and other tasks. Also, while the example of a robot is provided, the present application is also applicable to other devices and uses involving images.

The control module 120 may take one or more actions based on the explanation(s) for possible error in an image from a camera of the robot. For example, if an explanation is that an error in an image from a camera may be due to low light, the control module 120 may turn on a light 180 of the robot and illuminate a space in front of the camera. While the example of turning on a light under low light is provided, the present application is also applicable to other actions and other explanations of possible error.

Figure 3:
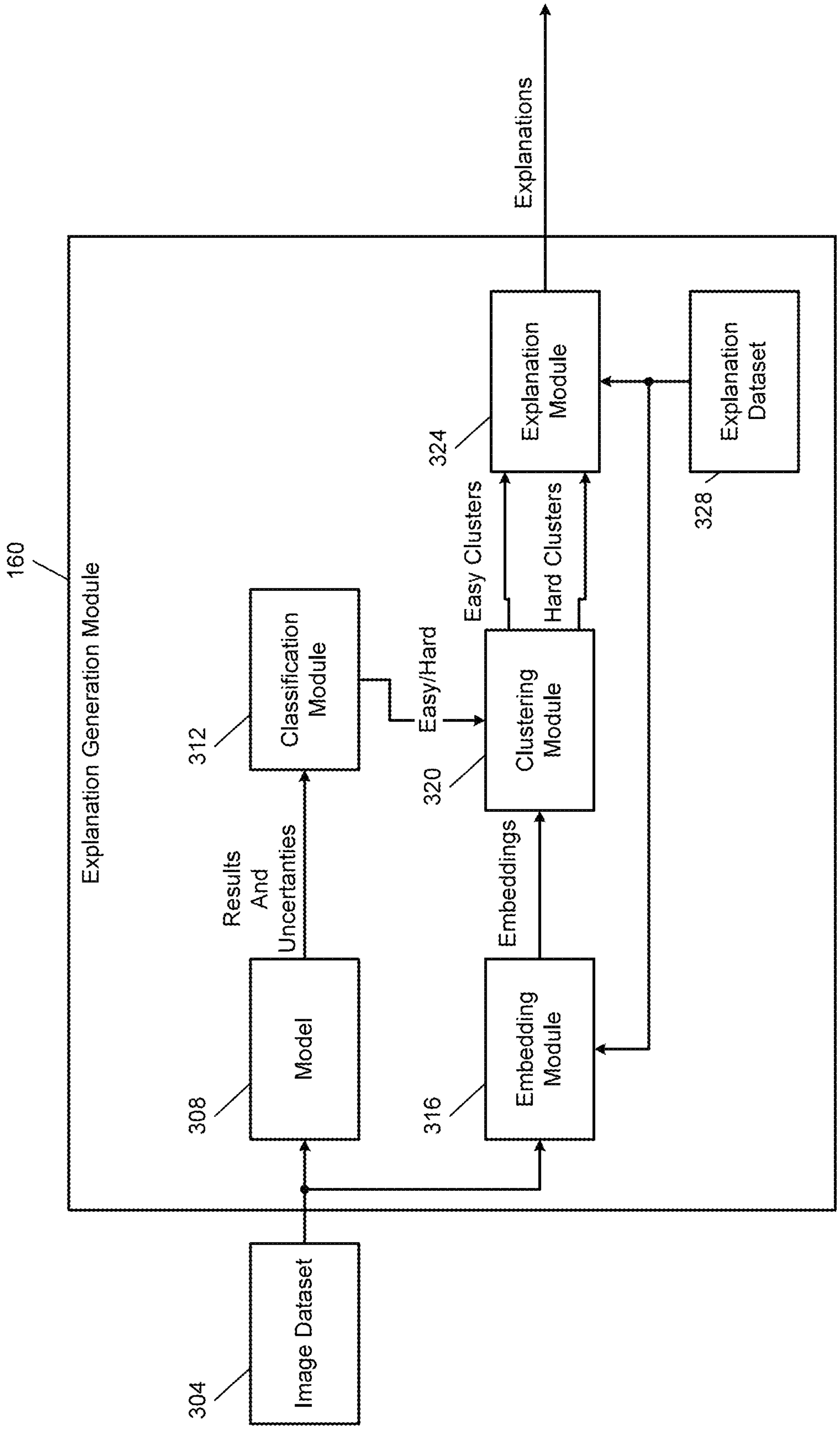
FIG. 3 is a functional block diagram of an example implementation of an explanation generation module.
Figure 4:
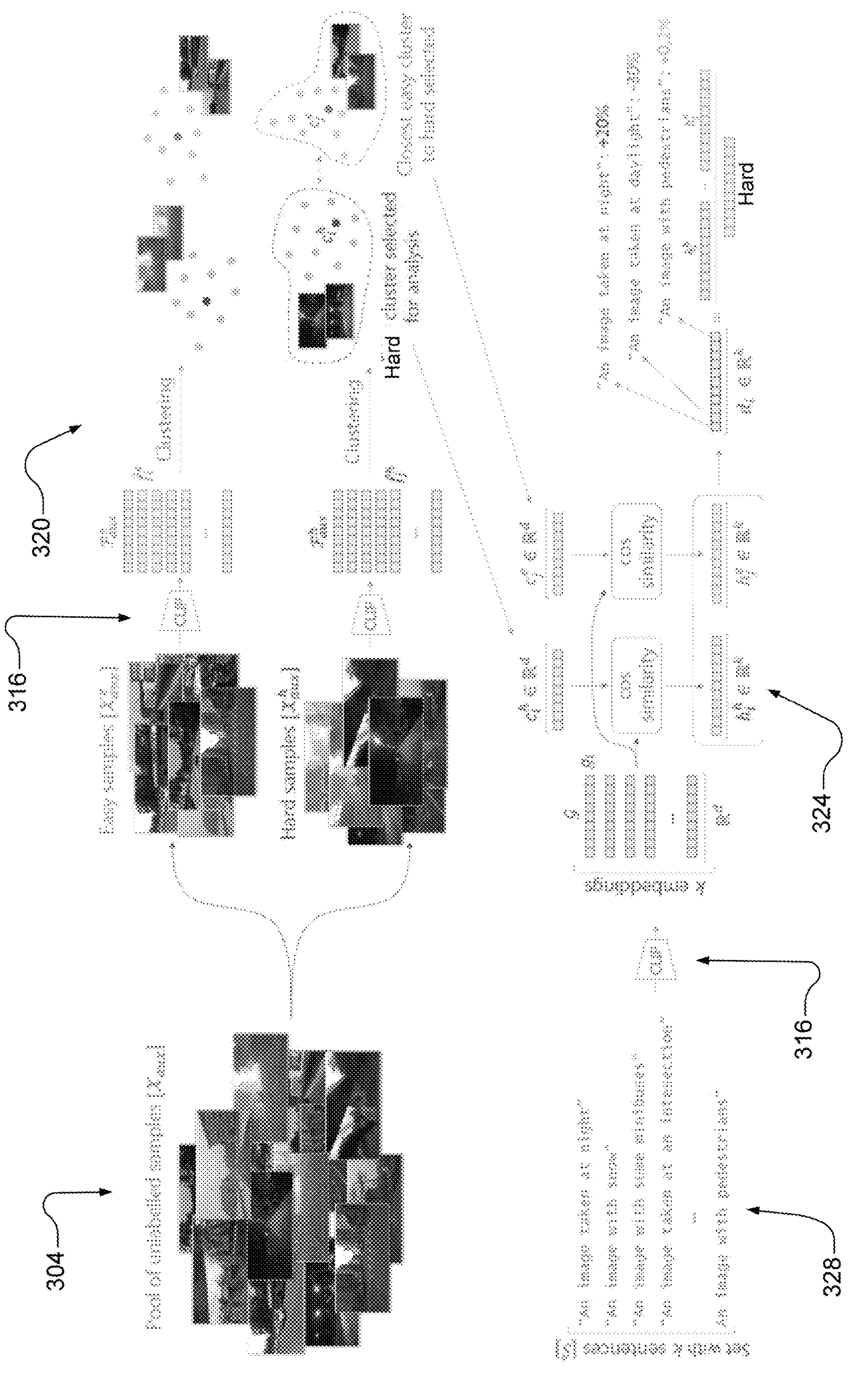
FIG. 4 is a block diagram illustrating an example of the explanation generation module.

FIG. 3 is a functional block diagram of an example implementation of the explanation generation module 160. FIG. 4 is a block diagram illustrating an example of the explanation generation module 160 of FIG. 3.

Images may be input to the explanation generation module 160, such as from an image dataset 304 or a camera. A (e.g., neural network) model 308 is configured to perform an image analysis task on the input images and generate results based on the images, respectively. The task may be, for example, semantic image segmentation, classification, or another suitable task. In the real world, the task may be performed by a module of the robot 200 (e.g., the semantic segmentation module 150).

The model 308 also generates uncertainties for the results, respectively. The uncertainty may express a degree of uncertainty of the model 308 in the result for an image being correct. The uncertainties may be, for example, values between 0 and 100 where 0 corresponds to 0 percent uncertainty about the model 308's predictions and 100 corresponds to 100 percent uncertainty about the model 308's predictions, independently by their actual correctness. While the example of values between 0 and 100 is provided another suitable system of indicating certainty of actual correctness or incorrectness may be used.

A classification module 312 classifies each image as being an easy image or a hard image. The classification module 312 may classify the images, for example, based on the uncertainties, respectively. For example, the classification module 312 may classify an image as being hard when the uncertainty of that image is greater than a first predetermined value, such as 60 in the example of values between 0 and 100. The classification module 312 may classify an image as easy when the uncertainty of that image is less than the first predetermined value or a second predetermined value that is less than the first predetermined value.

An embedding module 316 embeds/encodes each image using a predetermined embedding/encoding function. The embedding function may provide a cross-modal (text/image) embedding space which may represent both images and text, such as the CLIP embedding function, which is described in Alec Radford, et al., Learning Transferrable Visual models from Natural Language Supervision, in ICML, 2021, which is incorporated herein in its entirety.

A clustering module 320 clusters together the embeddings of the easy images into one or more first clusters of the embeddings of the easy images. The clustering module 320 also clusters together the embeddings of the hard images into one or more second clusters of the embeddings of the hard images.

An explanation module 324 determines an explanation for possible error in an image using text explanations in an explanation dataset 328. The explanation module 324 may determine an explanation for each hard image, such as described below.

Let Me be a model for an arbitrary computer vision task (e.g., classification, segmentation, detection, localization, etc.), namely the model 308, where parameters e of the model are previously trained on a training dataset, $X_{train}$. Let $$Xaux = \{x_i\}_{i=1}^{N}$$

be the image dataset 304, which may be an auxiliary set to assess the model Me to understand the model's mistakes.

A set of text sentences (e.g., captions), such as in the explanation dataset 328, is provided describing one or more traits of an image. Examples include "an image with people in the foreground" or "an image taken at night," etc. The set of explanations may be $$S = \{s_k\}_{k=1}^{K}.$$

The explanations may be user input or generated by an explanation algorithm, such as visual question answering (VQA) or captioning.

The embedding module 316 may include a multi-modal model configured to embed images and text in the same representation space, such as CLIP or another suitable model. The embedding module 316 includes a visual encoder configured to encode/embed images. The embedding module 316 also includes a text encoder configured to encode/embed text (e.g., the explanations). Let $\varepsilon_{vis}$ and $\varepsilon_{text}$ denote the visual and textual encoder, respectively.

The explanation module 324 automatically finds and describes (via the explanations) errors made by the model Me when applied to the images in the image dataset 304, which may include images from a new dataset/domain different than those upon which the model 308 was previously trained, such as in the visual conditions that the model 308 will be used in the real world. Formally stated, provided the model $M_\theta$, the image dataset Xaux and explanations/sentences S, the explanation module 324 provides sentences/explanations describing failure causes of the model 308 under the form of a set of sentences $$\left(\hat{S} = \{\hat{s_k}\}_{k=1}^{Q} \subset S\right).$$

In an example, the present application involves detecting the model 308's failure modes and associating them with textual explanations of reasons for the failures. The present application involves first dividing "easy" and "hard" images from the image dataset 304, according to a performance metric of the model 308, such as the uncertainty. Second, the clustering module 320 clusters representations in a joint text-image representation space, such as using CLIP. In this space, the clustering module associates sentences/explanations from the explanation dataset 328 that best characterize (e.g., most closely match) the "hard" clusters. The clustering module 320 may isolate factors that are specific to the "hard" clusters by finding their differences to their "easy" counterpart—the ones that are nearest in the embedding space.

As discussed above, first failure causes (reasons for error) of the model 308 are detected. The image dataset 304 may be unlabeled, meaning that no explanation is provided for each image. Given the unlabeled nature of the image dataset 304, a ground truth-free metric that reflects which images (samples) are "easy" and which samples are "hard" is used. For example, the uncertainty values may be used. The model 308 results/predictions generated based on the images may be described by $M_\theta:\hat{y}_\iota=M_{74}(x_i)$ and the uncertainty associated with each sample may be described by as $u_i=U(\hat{y}_\iota)$. This may be the entropy of the output. Two predetermined values may be used by the classification module 312 to classify whether an image is hard or easy, $$u_\epsilon^h \text{ and } u_\epsilon^e,$$

respectively. The classification module may classify a sample $x_i$ with $$u_i > u_\epsilon^h$$

as hard and a sample xi with $$u_i < u_\epsilon^e$$

as easy. In various implementations, the two predetermined values may be equal. Thus, the images of the image dataset 304 can be split into easy images and hard images. When the example of two different predetermined values, neutral (not easy and not hard) samples may be present and discarded from use. Having two different predetermined values may provide for better separation between "easy" and "hard" samples.

Regarding the clustering, let $$\mathcal{F}_{aux} = \{\hat{f}_\iota\}_{i=1}^N$$

be the representations (embeddings/encodings, such as vectors) from the embedding module 316 obtained by embedding samples in the multi-modal CLIP representation space ($\hat{f}_\iota)=\varepsilon_{vis}(x_i)$). Based on the division into easy samples and hard samples, let $$F_{aux}^h \text{ and } F_{aux}^e$$

be the sets of hard and easy representations, respectively. Representations in the $$F_{aux}^h$$

group may then cluster the hard representations using a clustering algorithm. Examples of clustering algorithms include kmeans clustering, agglomerative clustering, spectral clustering, or another suitable type of clustering. The clustering results in $N_h$ clusters for the hard images/samples. Centroids $C^h$ of the hard clusters can be described by $$C^h = \{c_i^h\}_{i=1}^{N_h}.$$

The centroids will be referred to as prototypes in the following. The clustering module 320 clusters the easy representations (representations for the easy images) using the same or a different clustering algorithm to generate easy clusters Ne with centroids/prototypes $$C^e = \{c_i^e\}_{i=1}^{N_e}.$$

The explanation module 324 determines the explanation for the hard clusters based on the centroids of the easy cluster as described below.

Regarding determining the explanations, let $$G = \{g_k\}_{i=1}^K$$

be the textual embeddings of the sentences (explanations) (from S) in the joint cross-modal embedding space after embedding by the embedding module 316 ($g_k=\varepsilon_{text}(s_k)$). For each prototype $c_i$ (omitting the easy/hard notation for simplicity), the explanation module 324 may determine a cosine similarity between the representation of the prototype and each textual embeddings from S in the cross-modal space. Let $h_{ik}=\text{sim}(c_i, g_k)$ be the similarity (sim) between the i-th prototype/cluster $c_i$ and the k-th embedded sentence $g_k$. This way, for each $c_i$ the explanation module 324 determines a vector $h_i \in R^K$, where the k-th element is $h_{ik}$. This allows the explanation module 324 to characterize each cluster in terms of its semantic similarity with the sentences in the explanation dataset S 328.

Let $$H^h = \{h_i^h\}_{i=1}^{N_h} \text{ and } H^e = \{h_i^e\}_{i=1}^{N_e}$$

be the set of such similarity vectors generated by the explanation module 324 for the hard and easy clusters, respectively. To isolate the factors that characterize a hard cluster $$c_i^h$$

but not the neighboring easy clusters (which the assumption may be that the sentences are more closely associated with the error sources), for each hard cluster two example solutions are provided.

As one example, the explanation module 324 may determine the distances between the similarity vector $$h_i^h$$

and the similarity vector $$h_j^e,$$

corresponding to $$h_j^e,$$

which is the closest easy cluster centroid to $$c_i^h$$

in the embedding space. The explanation module 324 may determine the sentences/explanations that best characterize $$c_i^h$$

in comparison to $$c_j^e,$$

the based on an element-wise normalized difference (e.g., smallest difference) between $$h_i^h \text{ and } h_j^e,$$

:

$$d_i = \frac{h_i^h - h_j^e}{h_j^h}, \tag{1}$$

where the kth element is defined as $$d_i[k] = \frac{h_i^h[k] - h_j^e[k]}{h_j^h[k]}.$$

A high (large) positive value for $d_i[k]$ may mean that the kth sentence in S characterizes the hard cluster as substantially better than the closest easy one. Note however that using selection purely based on top values of $d_i$ may not be sufficient as the value for $d_i[k]$ can be high also for sentences non relevant for the hard cluster. Therefore, the obtained sentence set is may further be filtered by the explanation module 324 by the list of sentences obtained by thresholding the similarity vector $$h_i^h.$$

As a second example, instead of considering the distance vector d, the explanation module 324 may select representative sentences for both the easy and hard clusters based on (e.g., ones greater than) a predetermined value (e.g., 25) or ranking the values of $$h_i^h$$

and select the sentences corresponding to a given value (e.g., 95% or another suitable value). Then, to keep the sentences characterizing only the hard but not the easy cluster, the explanation module 324 may consider set differences, such as by removing from the set of sentences retained for the hard cluster the ones which were also retained for the closest easy cluster.

To determine explanations, the explanation module 324 may either rank $d_i$ and consider the sentences corresponding to the top values (e.g., top-k, where k is an integer greater than or equal to 1) in the difference vector. Alternatively, the explanation module 324 may determine an explanation based on all sentences for which the value $d_i[k]$ is greater than a predetermined value. $\widehat{S_i^h} \subset S$ may be the set of sentences selected for centroid $$c_i^h,$$

and may be used by the explanation module 324 as reference for potential failure explanation for images belonging to that cluster. To characterize the set of potential reasons for the whole dataset, the explanation module 324 may consider the union of these sets, i.e.

$$\hat{S} = U_{i \in N_h} \widehat{S_i^h}.$$

Determining explanations as provided herein could be used by a robot, for example, to better understand erratic and/or improper behavior before deployment. The present application is also applicable to other uses. For example, the explanation determination described herein may be used for test-time image analysis. At test time, given a test image $x_i$ yielding a high uncertainty $u_i$, the explanation generation module 160 may embed the image in the joint space described above and determine whether the image belongs to one of the identified hard clusters. If so, the explanation module 324 may determine the assigned explanations $$\widehat{S_i^h} \subset S.$$

As another example, the explanation generation module 160 may, prior to deployment, determine if a sample presents high risk by its closeness to these hard clusters, such as for the case where the inference cost of the model is much higher than computing the image embedding.

Another example use of the explanation determination discussed herein is active learning. Once multiple reasons for errors have been identified, additional samples associated with those errors can be collected and used by a training module with annotations for the errors to re-train the model 308. For example, given a semantic segmentation model that exhibits error with rain in images, multiple images including rain can be used along with annotations by the training module to re-train the semantic segmentation model.

Another example use of the explanation determination discussed herein is data dependent model selection. Provided are a set of models and identification of the hard and easy clusters with their explanations for each model. These pretrained models might perform differently depending on the type of data acquisitions, environment, etc. When a new set of data is considered, before deploying a model, the explanation generation module 160 may project the data in the embedding space and assess the model performance on the new set. The explanation generation module 160 can give an overview of how each model might perform on the new data and use the overview to select one of the models for use.

Another example use of the explanation determination discussed herein is text-guided data augmentation. If improving a model is possible, e.g., by fine-tuning or re-training, the explanation generation module 160 may generate data for training. Indeed, the textual explanations produced by method describing the typical errors can be used as a signal to guide the data augmentation pipelines and re-training of the model. For example, a model failing in high brightness conditions can be improved by generating more images with high brightness for the re-training.

FIG. 4 provides a graphical illustration of the concepts of FIG. 3.

Figure 5:
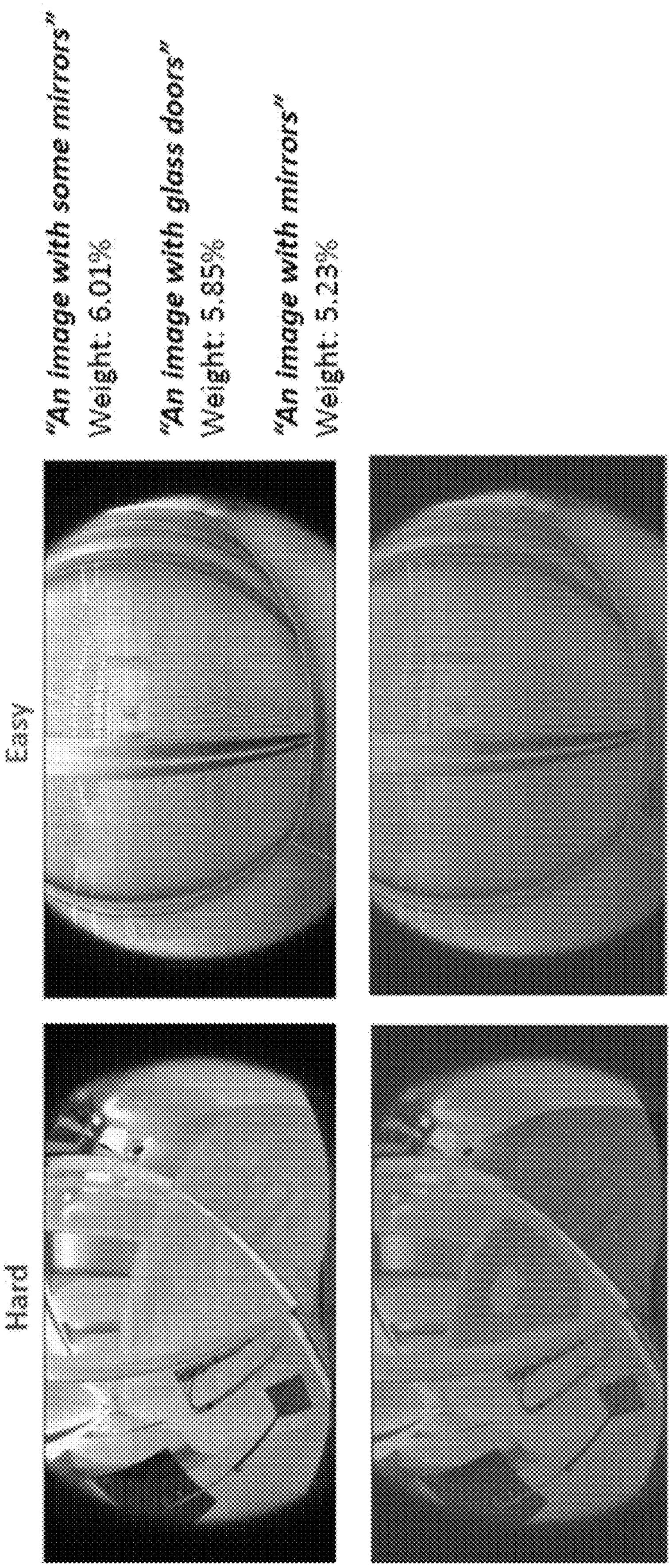
FIG. 5 includes example images.

FIG. 5 includes example images. The top row of images are input images, and the bottom row of images are segmented versions of the images of the top row, respectively. The goal was to perform semantic image segmentation on the top row of images. The left column of images are hard, while the right column of images are the closest easy image to the hard image of the left column. Example explanations for error of the model performing semantic image segmentation are provided on the right. As illustrated, images with wires present, thus the high scores (weights) determined by the explanation module 324 for the hard image including mirrors or glass doors.

Figure 6:
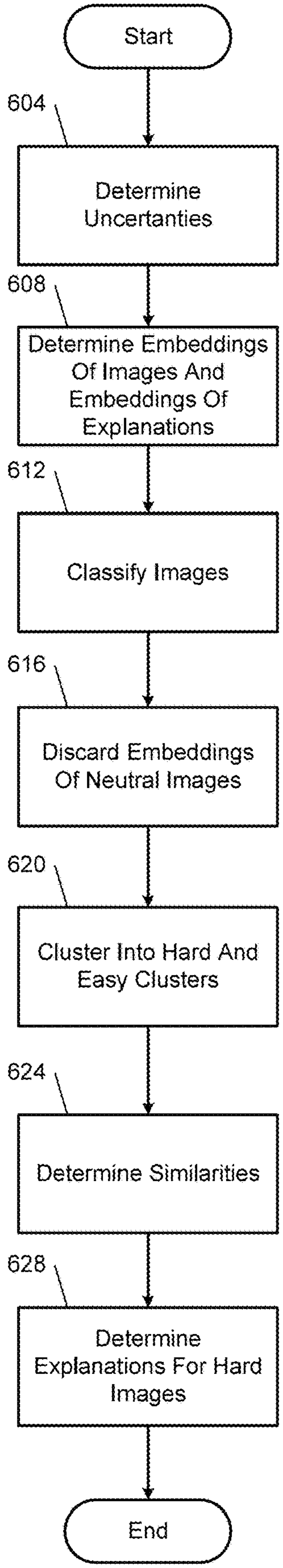
FIG. 6 is a flowchart depicting an example method of determining an explanation.

FIG. 6 is a flowchart depicting an example method of determining explanations. Control begins with 604 where the model 308 determines uncertainties based on images in the image dataset 304. The uncertainties reflect uncertainty as to correctness of results of the model 308 in performing a task on the images, such as semantic image segmentation.

At 608, the embedding module 316 determines embeddings based on the images, respectively, and embeddings based on the explanations in the explanation dataset 328, respectively, such as using the CLIP image/text embedding function.

At 612, the classification module 312 may classify the images based on the uncertainties, respectively. The classification module 312 may classify each image as being hard or easy, or as being hard, easy, or neutral. At 616, the classification module 312 may discard embeddings of neutral images if images are classified as neutral.

At 620, the clustering module 320 clusters the embeddings/representations of the easy images into easy clusters. The clustering module 320 also clusters the embeddings/representations of the hard images into hard clusters.

At 624, the explanation module 324 determines similarities. The explanation module 324 determines similarities (e.g., cosine similarity) between the representation of the centroid/prototype of a hard cluster and each other cluster and each sentence/explanation embedding. This produces vectors that express semantic similarities to each other cluster or sentence/explanation. The explanation module 324 determines the element wise normalized differences between a hard cluster and the easy clusters as described above. The explanation module 324 selects the top k explanations (e.g., the k explanations corresponding to the highest normalized differences and filtered based on the similarities between the hard cluster center and the text representations), and associates with the hard cluster. At 628, the explanation module 324 may output these k explanations as the explanations for possible error in an image in the hard cluster, such as visibly on a display and/or audibly via one or more speakers.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An error explanation system, comprising:
- a model configured to perform a task on images of an image dataset and to determine uncertainties of results of the task based on the images, respectively;
- a classification module configured to selectively classify the images into a first category or a second category based on the uncertainties, respectively;
- an embedding module configured to:
  - determine first embeddings based on the images using an embedding function;
  - determine second embeddings for textual explanations of errors of the model based on the textual explanations, respectively, using the embedding function;
- a clustering module configured to:
  - cluster first ones of the first embeddings for images classified in the first category into first clusters;
  - cluster second ones of the first embeddings for images classified in the second category into second clusters; and
- an explanation module configured to:
  - determine similarity between each centroid of each of the first and second clusters and each of the textual explanations; and
  - determine k of the textual explanations for one of the second clusters based on the similarities,
  - where k is an integer greater than or equal to one.

2. The error explanation system of claim 1 wherein the embedding function is the CLIP embedding function.

3. The error explanation system of claim 1 wherein the classification module is configured to:
- classify first ones of the images into the first category based on the first ones of the uncertainties of the first ones of the images being less than a first predetermined value; and
- classify second ones of the images into the second category based on the second ones of the uncertainties of the second ones of the images being greater than a second predetermined value.

4. The error explanation system of claim 3 wherein the first predetermined value is equal to the second predetermined value.

5. The error explanation system of claim 3 wherein the first predetermined value is less than the second predetermined value.

6. The error explanation system of claim 5 wherein the explanation module is configured to discard third ones of the images based on third ones of the uncertainties of the third ones of the images being between the first predetermined value and the second predetermined value.

7. The error explanation system of claim 1 wherein the clustering module is configured to cluster first ones of the first embeddings into the first clusters using a clustering algorithm.

8. The error explanation system of claim 7 wherein the clustering algorithm includes k means clustering.

9. The error explanation system of claim 7 wherein the clustering algorithm includes one of agglomerative clustering and spectral clustering.

10. The error explanation system of claim 1 wherein the images of the image dataset do not include labels indicative of attributes of the images, respectively.

11. The error explanation system of claim 1 wherein the textual explanations are sentences of text.

12. The error explanation system of claim 1 wherein the explanation module is configured to, based on differences between similarities corresponding to the same sentences and normalization, determine the k of the textual explanations for the one of the second clusters.

13. The error explanation system of claim 1 wherein the k of the textual explanations describe how the one of the second clusters differs from one of the first clusters.

14. A robot including:
- the error explanation system of claim 1;
- a camera; and
- a control module configured to take a remedial action based on an image from the camera being associated with the k of the textual explanations.

15. The robot of claim 14 wherein the remedial action includes turning on a light of the robot.

16. The error explanation system of claim 1 wherein the explanation module is configured to determine the similarities using cosine similarities.

17. A system including:
- a camera; and
- the error explanation system of claim 1.

18. A system for determining explanations for uncertain results, comprising:
- a neural network model configured to perform a task on input data of an input dataset and to determine uncertainties of results of the task based on the input data, respectively, where input data of the input dataset do not include labels indicative of attributes of the input data, respectively;
- a classification module configured to selectively classify the input data into a first category or a second category based on their uncertainties of results of the task determined by the neural network model, respectively;
- an embedding module configured to, using an embedding function, determine first embeddings based on the input data of the dataset and second embeddings based on textual explanations of uncertainties of results of an explanation dataset,
- where the textual explanation of uncertainties of results in the explanation dataset identify characteristics of the input data that may result in uncertainty of results when the neural network model performs the task on the input data, respectively;
- a clustering module configured to cluster the first embeddings for input data into a first cluster and a second cluster, corresponding to a first category and a second category, respectively; and
- an explanation module configured to determine k of the textual explanations for one of first and the second clusters having highest degree of similarity with the textual explanations of uncertainties of results of the explanation dataset, where k is an integer greater than or equal to one.

19. The system for determining explanations for uncertain results of claim 18, wherein the input data is image data and the input dataset is an image dataset.

20. The system for determining explanations for uncertain results of claim 19, wherein the textual explanations explain a possible source of error associated with the task performed on the image using the neural network model.

21. A system for determining explanations for uncertain results, comprising:
- a neural network model configured to perform a task on image data of an image dataset and to determine uncertainties of results of the task based on the image data, respectively, where image data of the image dataset do not include labels indicative of attributes of the image data, respectively;
- a classification module configured to selectively classify the image data into a first category or a second category based on their uncertainties of results of the task determined by the neural network model, respectively;
- an embedding module configured to use an embedding function to determine first embeddings based on the image data of the dataset and second embeddings based on textual explanations of uncertainties of results of an explanation dataset, where the textual explanation of uncertainties of results in the explanation dataset identify characteristics of the image data that may result in uncertainty of results when the neural network model performs the task on the image data, respectively;
- a clustering module configured to cluster the first embeddings for image data into a first cluster and a second cluster, corresponding to a first category and a second category, respectively; and
- an explanation module configured to determine k of the textual explanations for one of first and the second clusters having highest degree of similarity with the textual explanations of uncertainties of results of the explanation dataset, where k is an integer greater than or equal to one.

22. An error explanation method comprising:
- by a model configured to perform a task on images of an image dataset, determining uncertainties of results of the task based on the images, respectively;
- selectively classifying the images into a first category or a second category based on the uncertainties, respectively;
- determining first embeddings based on the images using an embedding function;

determining second embeddings for textual explanations of errors of the model based on the textual explanations, respectively, using the embedding function;

clustering first ones of the first embeddings for images classified in the first category into first clusters;

clustering second ones of the first embeddings for images classified in the second category into second clusters;

determining similarity between each centroid of each of the first and second clusters and each of the textual explanations; and determining k of the textual explanations for one of the second clusters based on the similarities, where k is an integer greater than or equal to one.

* * * * *